United States Patent
Hatjasalo et al.

(10) Patent No.: US 6,505,955 B1
(45) Date of Patent: *Jan. 14, 2003

(54) METHOD FOR PRODUCTION OF CONDUCTING ELEMENT AND CONDUCTING ELEMENT

(75) Inventors: Leo Hatjasalo, Helsinki (FI); Kari Rinko, Helsinki (FI)

(73) Assignee: Oy Modular Technology Group Engineering Ltd., Helsinki (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,331

(22) PCT Filed: Nov. 14, 1997

(86) PCT No.: PCT/FI97/00697

§ 371 (c)(1),
(2), (4) Date: May 19, 1999

(87) PCT Pub. No.: WO98/23896

PCT Pub. Date: Jun. 4, 1998

(30) Foreign Application Priority Data

Nov. 25, 1996 (FI) .................................. 964696

(51) Int. Cl.[7] .............................. F21P 1/00; F21K 7/00; F21S 4/00
(52) U.S. Cl. ...................... 362/235; 362/234; 362/240; 362/800; 264/171.13; 264/171.17; 264/171.21; 264/272.17
(58) Field of Search .................................. 362/152, 153, 362/153.1, 234, 235, 249, 252, 253, 800, 240; 156/244.12, 244.25; 315/185 R; 264/171.14, 171.13, 171.17, 171.21, 272.17

(56) References Cited

U.S. PATENT DOCUMENTS

| | | | | |
|---|---|---|---|---|
| 4,727,457 A | * | 2/1988 | Thillays | 362/26 |
| 5,032,960 A | * | 7/1991 | Katoh | 362/240 |
| 5,162,696 A | * | 11/1992 | Goodrich | 313/511 |
| 5,193,895 A | | 3/1993 | Naruke et al. | |
| 5,496,427 A | | 3/1996 | Gustafson et al. | |
| 5,559,681 A | * | 9/1996 | Duarte | 362/237 |
| 5,661,374 A | * | 8/1997 | Cassidy et al. | 315/185 R |
| 5,927,845 A | * | 7/1999 | Gustafson et al. | 362/152 |
| 6,074,074 A | * | 6/2000 | Marcus | 362/240 |

FOREIGN PATENT DOCUMENTS

| | | | |
|---|---|---|---|
| EP | 0677695 A2 | * | 10/1995 |
| EP | 0 760 448 | | 3/1997 |

* cited by examiner

*Primary Examiner*—Michael W. Ball
*Assistant Examiner*—Barbara J Musser
(74) *Attorney, Agent, or Firm*—Swidler Berlin Shereff Friedman, LLP

(57) ABSTRACT

Method for production of conducting element, which conducting element consists at least of an elongated electricity conductive, in which several electric components (2), bringing out the lighting operation or like according to the use of the conducting element, are being attached to one after another in the longitudinal direction (s), whereafter the said entirety is being surrounded by a casing part (3) protecting the same. The conducting element is being manufactured from an essentially flat conductor part (1; 1'), such as a band, a stripe or a like, into which there has been attached electric components (2'), such as probes, LEDs, resistors and/or the like by arranging the same, preferably throughout built-in when viewed in a cross section with a casing material (3') forming the said casing part (3), by exploiting a continuous manufacturing process, such as extrusion or like. The invention relases to a conducting element to be manufactured by the method, also.

23 Claims, 2 Drawing Sheets

METHOD FOR PRODUCTION OF CONDUCTING ELEMENT AND CONDUCTING ELEMENT

Figure 1:
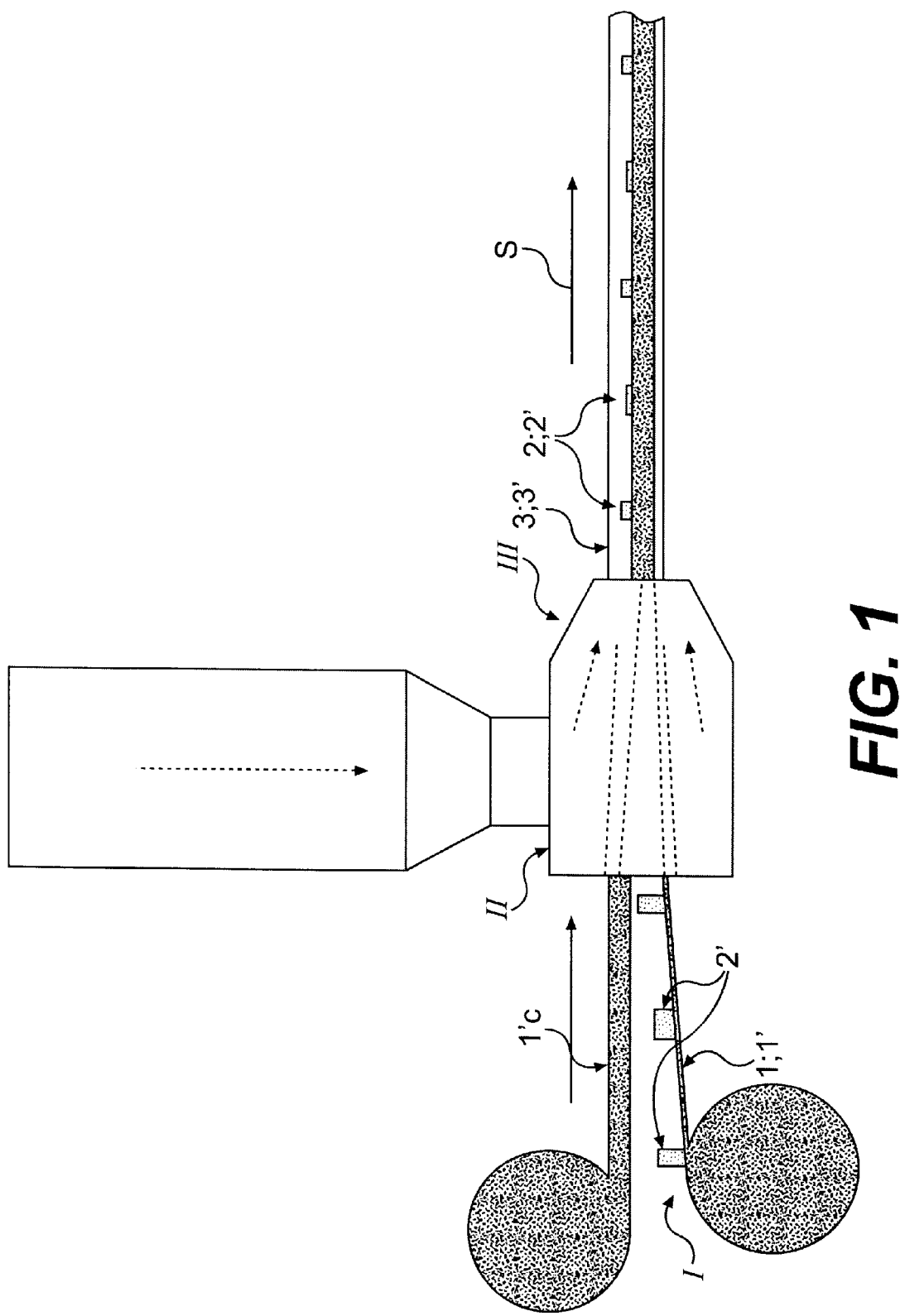

The present invention relates to a method for production of conducting element, which conducting element consists at least of an elongated and essentially flat electricity conductive conductor part, such as a band, a strip or a like, in which several electric components, such as probes, LEDs, resistors and/or the like bringing out the lighting operation or the like according to the use of the conducting element, are being attached to one after another in the longitudinal direction, and of a casing part, which conducting element is being manufactured by arranging the conductor part and the components existing therewith when viewed in a cross section totally surrounded by a casing material forming the said casing part, by exploiting a continuous manufacturing process, such as extrusion or like.

In light operated guidance devices, that are meant, for example, to guide sports performances, it is previously known to use lamps that are connected one after another to an electric conductor placed inside a transparent pipe, which guide the athletes' performance according to a predrafted programme. In this case, when following the lamps getting lighted one after another, the athlete may keep the previously defined speed. The type of traditional solutions described above are usually based on guidance devices, that have been put together completely one by one from separate parts and in which usually bulbs have been used as lamps, that have been connected in series to the electric conductor passing through a transparent pipe. When using the type of guidance devices above adequate attention must be payed to the tightness of the casing part, so that water may not enter inside the guidance device, when the same is being used in damp circumstances, for example, in a swimming pool.

On the other hand it is known to use also certain type of electric guidance devices or like, that are manufactured one by one and that may be used e.g. the way described above when being coupled to each other one after another. This type of solutions are usually produced by molding the same inside transparent plastics, that is why when coupling the guidance devices to each other completely separate coupling wires must be used, that must naturally be protected separately as well when the same are being used e.g. for guiding purposes under particularly demanding circumstances, such as in inflammable or the like accommodations. Protection of the intermediate wires require thus careful installation or auxiliary measures and components during actual production of the devices on the one hand e.g. to prevent sparkling to the surroundings and on the other hand to protect the electric wires and actual lighting devices from water or humidity of the surroundings.

Furthermore e.g. from U.S. Pat. No. 5,496,427 it is previously known to produce fully capsulated lighting strip based on electroluminance by extrusion. This type of solution, that is purely based on electroluminance, may be carried out in a totally traditional way by using merely elongated leads and intermediate strips, that continue constant (cf. electric cables). Instead of the above, with a structure that is based according to the present invention on printed circuit board technics, it is possible to achieve a conducting strip, that operates particularly dynamically as well and in which there exists a light effect, that moves along the guiding direction. This type of solution may not in any way be achieved by the strip according to the above US Patent, that is based on electroluminance, because it operates by on/off principle only.

On the other hand it is no doubt previously known from U.S. Pat. No. 5,193,895 as well to produce an elongated strip for lighting purposes. In this patent there has not been presented, however, particularly a moisture resistant end product, that may be achieved just by exploiting extrusion being mentioned above. The type of solution is thus based on at least two separate parts, in which case moisture will cause always problems in practice, when the same enters between the part layers. With this type of solution it is not either possible to end up to a conducting strip, that operates dynamically as described above, but the conducting strips enabled by the solution in question always operate by on/off principle.

Furthermore in EP Application 760448 (which application has become public, however, only after the priority date of the invention in question) there has been represented a solution, which is first of all based on two or more continuous conducting bars passing throughout the whole conducting strip, into which LEDs are connected one after another in the longitudinal direction. The first variation in the application comprises a solution, which consists of two elongated conducting bars, into which there has been attached LEDs, which entirety has been extruded by a suitable plastic based paste to achieve a built-in elongated conducting strip. The other variation in the application is such, that in addition to the conducting bars a binding strip is being fed to the extrusion apparatus, that is unwound from a roll and that is continuous in the longitudinal direction and on top of which there exists separate printed circuit boards, in which the LEDs have been installed. Because in this variation there has been used conducting bars as well, that are continuous in the longitudinal direction, and that are attached to the contact surfaces existing in those totally separate printed circuits by means of separate pressing rollers, it is not possible with the type of solution in question to achieve such dynamic operation of the conducting strip as described above, but instead the solution in question is further based on traditional on/off use.

In the solution in question the starting point is thus always such, that the conducting strip comprises at least two or more conducting bars passing continuously from one end to the other end of the same and into which the LEDs are connected either directly or by using furthermore a binding strip, on which the separate printed circuit boards equipped with LEDs have been supported. This is why the solution in question is particularly with a view to manufacturing technics as well as by the construction of the same disproportionately complicated, because in connection with the same there must furthermore be used first of all conducting bars, continuing in the longitudinal direction, because of the printed circuit boards, that are electrically totally separate in respect to each other, to connect the printed circuit boards and LEDs existing therewith to each other to achieve at least a static operation of the conducting strip.

A method of this invention has an object of providing a decisive remedy to the above discussed problems and, thus, of raising substantially the existing prior art. In order to achieve this object, the method of the invention is substantially characterized in, that the electric components of a conducting element, that enables preferably dynamic use, are being attached preferably by means of surface mounting technics to an electric conductor layer, such as to a copper coating or like of a basic material, that is made of plastics, such as polyamide, polyesters polyethylene napthalate or like, of the conductor part, that is based on so called printed circuit board technics, whereby the electric conductor layer continues essentially uninterruptedly over the whole length of the conducting element, whereafter the entirety being brought out is being surrounded by a casing material, that is based on plastics such as PVC, polyurethane, olefin and/or like.

The most essential benefits of the method of the invention include its simplicity and operating reliability, which enables significantly more profitable production when compared to nowadays conducting elements. The method according to the invention enables first of all a very low profile, thanks to which conducting elements according to the invention may be used e.g. in connection with vinyl floors, because a guiding element enabled by the method, the height of which is below 2 mm, may be installed completely to the same level as the vinyl floor surface surrounding the same. The method according to the invention enables that as well, that the conducting element is water and gas proof, thanks to which a conducting elements being produced by the method according to the invention may be used both in damp or wet rooms/surroundings as well as e.g. in inflammable surroundings. The method according to the invention enables a structure, that has a very strong surface, wherein a conducting element being built e.g. into a floor does not significantly differ from the original vinyl floor surrounding the same by its surface hardness. The method according to the invention is based on very usual extrusion technics in principle, which however, when being used in this connection enables surprising possibilities with a view to production and final dimensions of the conducting element to be produced by the method, whereby the dimensions, shapes and electric characteristics of the conducting element to be produced may be altered very easily by making only the necessary simple technical changes during each working phase. By exploiting the method according to the invention it is possible to produce a continuous and flexible conducting element, that may be stored on roll and in addition to the above straight bar-like conducting elements naturally as well. The invention enables furthermore production of a conducting element, that is secured electrically by loop principle merely thanks to the conductor part existing therewith, that has been carried out by printed circuit board technics. It may be stated in this connection as well, that the bendability of e.g. the solution particularly according to the above EP application may be questionable, because in this solution the conducting bars are being pressed against the contact surfaces existing in the conducting printed circuit boards, in which case when bending the conducting strip, the components in question probably get separated, in which case the electric contact breaks.

Thanks to the invention it is possible to produce conducting strips, that differ from the visual point of view from all previous solutions as well, by feeding e.g. differing coating colour layers to the extrusion apparatus. The colour layers may be of the same colour as the background, self luminous or e.g. reflective. It is furthermore possible to arrange e.g. lences in connection with the colour layers, that are placed on the LED-component surfaces. In this way it is possible within a solution according to the invention to combine intelligently effect of both light and reflective/self-luminous colour.

The non-independent claims directed to the method said worth preferred embodiments for the method of the invention.

The invention relates also to a conducting element to be produced by the method, that is defined in more detail in the preamble of the independent claim directed thereto. The features essentially characteristics for the conducting element are set forth in the characterizing section of the same claim.

The most significant benefits of the conducting element according to the invention include simplicity and operating reliability of production, construction and use of the same. Particularly use of a so called continuous manufacturing process, that means so called extrusion, enables first of all that, that the length of a conducting element according to the invention may be even hundreds of meters. The conducting element according to the invention may be produced as a completely intergrated structure and as an essentially water and gas tight or moisture resistant structure. The conducting element according to the invention may be dimensioned very small, in which case it may be used as totally built-in with a vinyl floor, in which case the surface strength and the like characteristics of the same further correspond essentially to the characteristics of the vinyl floor surrounding the same. In addition to that, thanks to the conductor part being carried out electrically by printed circuit board techniques, the conducting element may be produced in a way, that it operates either statically (no alteration of direction) or dynamically (with alteration of direction), in which case the conducting element operates despite the fact, that some of the electric components malfunction. In case the conducting element needs to be prepared it may be carried out simply by changing pieces of the conducting elements, the length of which correspond one or several sections of the same, by using, for example, soldering or mechanical couplings within joints, whereafter the jointing points may be sealed furthermore with a plastic matrix corresponding to the surface of the strip. The conducting element according to the invention may thus be exploited in most heterogeneous connections and uses, e.g. in public accommodations, ship surroundings, aeroplanes, terminals etc. or for normal guiding purposes, for emergency or safety lighting purposes, for control, guidance use, monitoring, measuring and/or observing purposes etc.; the conducting element according to the invention may be produced according to the nowadays LLL-requirements (Low Location Lighting).

Figure 2A:
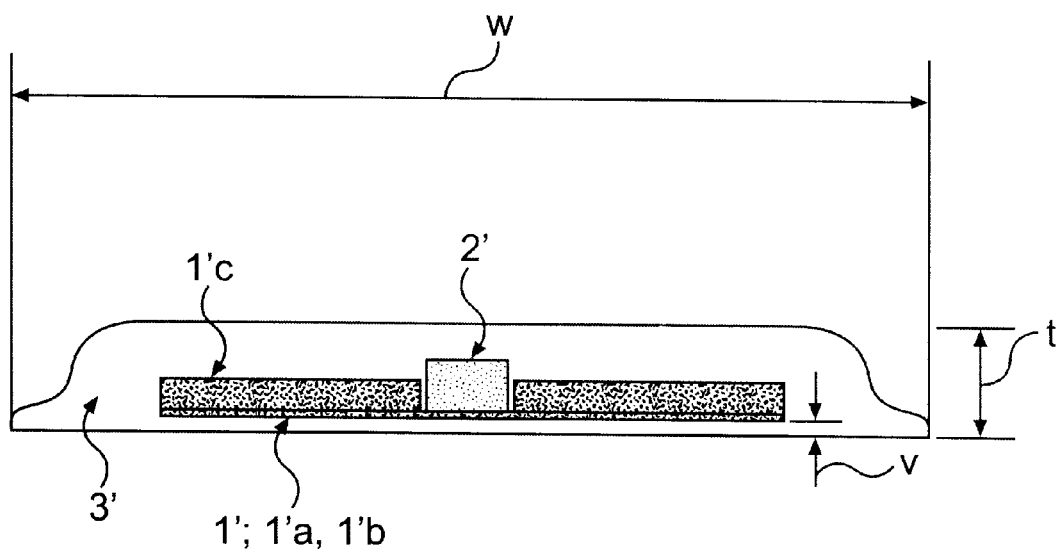
Figure 2B:
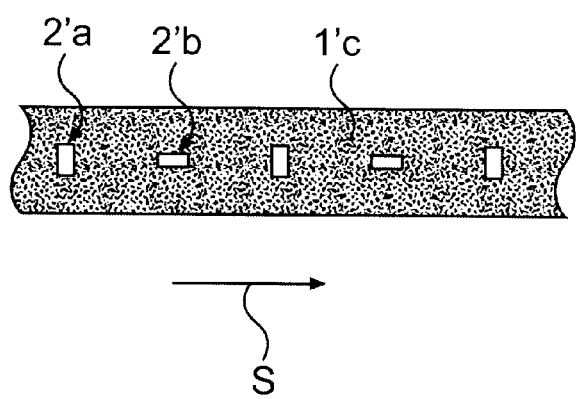

The invention will now be described in more detail with reference made to the accompanying drawings, in which FIG. 1 shows one advantageous general principle of the method according to the invention and FIGS. 2a and 2b show one advantageous conductor strip being produced by the method according to the invention as a cross-section (FIG. 2a) and a covering band being used in a conductor strip according to the invention seen from above (FIG. 2b).

The invention relates to a method for production of conducting element, which conducting element consists at least of an elongated and essentially flat electricity conductive conductor part 1; 1', such as a band, a strip or a like in which several electric components 2; 2', such as probes, LEDs, resistors and/or the like bringing out the lighting operation or like according to the use of the conducting element, are being attached to one after another in the longitudinal direction s, and of a casing part 3. The conducting element is being manufactured by arranging the conductor part and the components existing therewith 1; 1', 2; 2' when viewed in a cross section totally surrounded by a casing material 3' forming the said casing part 3, by exploiting a continuous manufacturing process, such as extrusion or like. The electric components 2' of a conducting element, that enables preferably dynamic use as well, are being attached preferably by means of surface mounting technologies to an electric conductor layer 1'b, such as to a copper coating or like of a basic material 1'a, that is made of plastics, such as polyamide, polyester, polyethylene napthalate or like, of the conductor part 1', that is based on so called printed circuit board technics, whereby the electric conductor layer 1'b continues essentially uninterruptedly over the whole length of the conducting element, whereafter the entirety being brought out is being surrounded by a casing material 3', that is based on plastics such as PVC, polyurethane, olefin and/or like.

Furthermore as an advantageous embodiment, the electric conductor layer 1'b, such as copper coating or like of the conductor part, that is made of a continuous flexible printed circuit board, is being coated at least by the parts surrounding the electric components 2' by a covering colour, film 1'c or like before processing of the casing material 3'.

Furthermore as an advantageous embodiment of the method with reference particularly to FIG., 1 the electric components 2' are being attached during a first phase I by surface processing technics to the flexible conductor part 1', that is preferably unwound from a roll, whereafter at least the covering colour, strip 1'c or like surrounding at least the electric components 2' of the conductor part 1' is being attached to the same during a second phase II and wherein the same is being extruded during a third phase II by a casing material 3' surrounding the same essentially overall. Naturally it is possible to vary the above working stages in a way, that the electric components are placed after the covering strip 1'c has been installed.

Futhermore as an advantageous embodiment of the method, during production of the conducting element co-extrusion is being exploited in other words by using e.g. three parallel extrusion nozzles particularly for colouring the longitudinal sectors of the conducting element to be produced alternatively or for a corresponding purpose.

With reference to the method described above during a premanufacturing stage the desired lay-out of the conductor part 1' is being designed and produced. Thereafter a film is being produced from the lay-out in question, the size of which is preferably 1500 mm×600 mm, whereafter a sieve for the silk-screen is being produced from the film. After this the protective colour is being brought by means of the sieve on top of the electric conductor layer 1'b existing on the basic material 1'a of the conductor part, whereafter etching of the conductor part 1' is being carried out, thanks to which the desired electric lay-out of the copper surface is achieved.

With the method described above it is possible to produce several parallel conductor parts to the same preform in the same connection, which are being cut from each other after the stages described above and driven on roll, whereafter the continued process has been described above. The uninterrupted length of a continuous printed circuit board being produced e.g. the way described above and thanks to that the conducting element as well may be easily even 300 m.

A conducting element according to the invention consists thus of an elongated electricity conductive conductor part 1; 1', which has several succesive electric components 2; 2' that bring out e.g. a lighting operation, which entirety has furthermore being surrounded by means of a casing part 3; 3' protecting the same. The electric components 2' of a conducting element, that enables at least dynamic use, are attached preferably by means of surface mounting technics to an electric conductor layer 1'b, such as to a copper coating or like to existing on a basic material 1'a, that is made of plastics, such as polyamide, polyester, polyethylene napthalate or like, of the conductor part 1', that is based on so called printed circuit board technics, whereby the electric conductor layer 1'b continues essentially uninterruptedly over the whole length of the conducting element, which entirety is surrounded throughout by a completely uniform casing material 3', that is based on plastics, such as PVC, polyurethane, olefin and/or like.

Furthermore as a particulary advantageous embodiment particularly to cover the e.g. copper coated outer surface of the conductor part 1', that is made of a continuous flexible printed circuit board, on top of the same there is arranged a covering colour film 1'c or like at least on the parts surrounding the electric components 2'. Particularly when a separate covering film is being used e.g. as shown in FIG. 2b, in which there has been prepared during a premanufacturing stage openings at points corresponding the places of the components 2'a, 2'b to be connected to the conductor part 1', the solution is advantageous in such respect, that by using a suitable material thickness therewith it is possible to even the outer surface of the conductor part particularly with a view to the extrusion stage. Small alterations in heigth on the outer surface of the conductor part 1' may be eliminated during manufacturing e.g. by altering drawing speed and/or extrusion pressure during extrusion.

Furthermore as an advantageous embodiment in connection with a conducting element, that is meant to be installed particularly built-in with a vinyl floor, the total thickness v of the conducting element is at the most 2 mm, whereby the thickness v of the casing material 3' of the lowermost part of the conductor part 1' is preferably 0,1–0,3 mm.

As a particularly advantageous embodiment with reference particularly to the general principle of the method shown in FIG. 1, the conducting element has been produced from a flexible conductor part, in which case the produced conducting element may be furthermore stored on roll. When exploiting in other respects nowadays technology existing completely already, it is possible to produce e.g. conducting element according to the invention, the breadth w of which is preferably between 5–1500 mm. The mentioned values may not in any way limit the solution being exploited in this connection, because it is possible to achieve smaller/greater dimensions than presented above by very simple arrangements.

Furthermore as an advantageous embodiment the conductor part 1' of the conducting element has been formed of at least two or several printed circuit boards or printed circuit board layers, that are electrically isolated from each other placed on one another. It is thus possible to produce e.g. a conducting element as well, in the printed circuit board of which there exists mutually differing and electrically isolated copper coatings on both opposite surfaces of the same. This type of embodiments have not been shown in the drawings, because they may be easily constructed in practice as embodiments, that are electrically isolated from each other, by arranging the coating conducting electricity only on one side of each printed circuit board layer. With the type of solutions it is possible to lead/transmit e.g. separate groups, canals passing in different kinds of buildings. In this way it is also possible to increase information being transmitted by the conductor strip without however essentially increasing the total thickness of the conducting element. Furthermore the electric components of the conducting element may comprise LED-matrices being placed one after another in the longitudinal direction as well, e.g. to form letters, figures or text. In addition to that multicolour LEDs may be used in certain kinds of embodiments as the electric components, in which case depending on the situation the colour of the LEDs is most suitable to each operating purpose (green/red etc.).

It is obvious, that the invention is not limited to the above described or discussed embodiments, but it can be subject to even major modifications within the context of the basic concept. As explained above it is thus naturally possible to produce elongated stiff structures as well apart from the type of flexible conducting elements as explained above. It is naturally possible to exploit e.g. base rods made of plastics in connection with the type of flexible structures as described above as well, when the conducting elements are being used e.g. in connection with textile floors or by exploiting aluminium or steel structured base rods when the same are being used particularly in connection with stone floors, in which it is not possible to make recessions or grooves, so that the conducting element could be built in the floor. It is naturally obvious as well, that it is advantageous to produce the conducting element according to the invention in a way, that it has parts of certain length, according to which the conducting element may be cut and repaired afterwards. The method according to the invention may be exploited in such a way as well, that instead of coating or colouring of the conductor strip, in connection with the extrusion a casing material is being used, the desired parts of which are e.g. opaque and from certain points furthermore transparent or see-through. Thanks to the moisture resistant structure enabled by the invention it is naturally important to pay attention to the moisture isolation of the mutual joints of e.g. the conducting elements to be coupled to each other one after another or of conducting elements and control unit/ power source, by using a joint material, that is suitable in this connection e.g. castable polyurethane.

What is claimed is:

1. A controllable electric strip device having a completely integrated flexible structure, comprising:
    a continuous, flexible and substantially flat printed circuit board comprising a base substrate and an electrically conductive layer etched to form electric circuitry on top of said base substrate, wherein said electric circuitry continues uninterruptedly over the length of the base substrate without bus bars;
    a plurality of electrically active members that are mounted longitudinally space apart on said electrically conductive layer; and
    a watertight, flexible and electrically insulating casing member enclosing said circuit board and said plurality of electrically active members.

2. A controllable electric strip device according to claim 1, wherein said base substrate is continuous, flexible and electrically insulating and said electrically conductive layer comprises copper, said printed circuit board further comprises:
    an electrically insulating surface coating that at least partly covers said printed circuit board.

3. A controllable electric strip device according to claim 1, wherein said electrically active members comprise electric components selected from the group consisting of probes, LEDs, LED matrices and resistors.

4. A controllable electric strip device according to claim 1, wherein said device has a total thickness not greater than 2 millimeters.

5. A controllable electric strip device according to claim 1, wherein said device has a breadth of about 5 to about 1500 millimeters.

6. A controllable electric strip device according to claim 1, wherein a thickness of a lowermost part of said casing member existing underneath said printed circuit board is about 0.1 to about 0.3 millimeters.

7. A controllable electric strip device according to claim 1, wherein said device comprises a plurality of subjacent printed circuit boards, wherein said plurality of circuit boards are electrically isolated from each other.

8. A controllable electric strip device according to claim 1, wherein said printed circuit board comprises an electrically conductive layer on both opposite sides of said base substrate.

9. A controllable electric strip device according to claim 1, wherein the manufacturing material of said casing member is selected from the group consisting of PVC, polyurethane and olefin.

10. A controllable electric strip device according to claim 1, wherein the manufacturing material of said base substrate is selected from the group consisting of polyamide, polyester and polyethylene napthalate.

11. A controllable electric strip device according to claim 1, wherein said electrically active members comprise surface-mounted components.

12. A controllable electric strip device according to claim 2, wherein said electrically insulating surface coating is a protective layer that covers the entire surface of said printed circuit board not occupied by said electrically active members.

13. A controllable electric strip device according to claim 2, wherein said electrically insulating surface coating is a color coating that covers the entire surface of said printed circuit board not occupied by said electrically active members.

14. A controllable electric strip device according to claim 3, wherein said electrically active members comprise alphanumeric LED matrices.

15. A controllable electric strip device according to claim 3, wherein said electrically active members comprise multi-color LED matrices.

16. A method for producing a controllable electric strip device having a completely integrated flexible structure, said method comprising:
    providing a supply of a continuous, flexible and substantially flat printed circuit board comprising a base substrate and an electrically conductive layer etched to form electric circuitry uninterruptedly over the length of said base substrate without bus bars;
    providing a supply of a plurality of electrically active members;
    providing a supply of a water-tight flexible and electrically insulating casing material;
    mounting said plurality of electrically active members spaced apart on the electrically conductive layer of said printed circuit board one after the other in the longitudinal direction; and
    extruding said casing material around said printed circuit board and said plurality of electrically active members.

17. A method for producing a controllable electric strip device according to claim 16, said method further comprising:
    providing a supply of an electrically insulating surface coating material; and
    mounting said electrically insulating surface coating material on the entire surface of said printed circuit board not occupied by said electrically active members.

18. A method for producing a controllable electric strip device according to claim 16, said method further comprising:
    providing a plurality of extrusion nozzles, wherein each of said nozzles is connected to an independent supply of variously-colored casing material; and
    after mounting said electrically active members on said printed circuit board extruding said variously-colored casing materials on said printed circuit board in order to form colored regions extending along the length of the substrate.

19. A method for producing a controllable electric strip device according to claim 16, wherein said plurality of electrically active members are mounted on the electrically conductive layer of said printed circuit board by surface mounting techniques.

20. A method for producing a controllable electric strip device according to claim 16, wherein providing said printed circuit board comprises:

providing a supply of a continuous, flexible and substantially flat base substrate made of plastics and comprising an electrically conductive layer made of copper on at least one side;

providing a supply of a protective color;

providing said protective color with a silk-screen printing sieve on top of said electrically conductive layer;

printing said protective color using silk screen printing on top of said electrically conductive layer; and etching said electrically conductive layer in order to form the electric circuitry.

21. A method for producing a controllable electric strip device, said method comprising:

providing a supply of a plurality of continuous, flexible and substantially flat printed circuit boards, each comprising a base and an electrically conductive layer that forms an electric circuitry integrally on said base;

providing a supply of a plurality of electrically active members;

providing a supply of a water-tight, flexible and electrically insulating casing material;

mounting said plurality of electrically active members spaced apart on the electrically conductive layers of said plurality of printed circuit boards one after the other in the longitudinal direction;

placing said plurality of printed circuit boards one on top of the other; and extruding said casing material around said printed circuit boards and said electrically active members.

22. A method for producing a controllable electric strip device, said method comprising:

providing a supply of a continuous, flexible and substantially flat printed circuit board comprising a base and electrically conductive layers that form electric circuitry integrally on opposite sides of said base;

providing a supply of a plurality of electrically active members;

providing a supply of a water-tight, flexible and electrically insulating casing material;

mounting said plurality of electrically active members spaced apart on the electrically conductive layers of said printed circuit board one after the other in the longitudinal direction; and extruding said casing material around said printed circuit board and said plurality of electrically active members.

23. A method for producing a controllable electric strip device having a completely integrated flexible structure, the method comprising:

mounting a plurality of electrically active members on a continuous, flexible and substantially flat printed circuit board comprising a base substrate and an electrically conductive layer etched to form electric circuitry uninterruptedly over the length of the top of the base substrate without bus bars; and extruding a water-tight flexible and electrically insulating casing material around the printed circuit board and the electrically active members.

* * * * *